United States Patent
Pforte et al.

(10) Patent No.: US 8,659,438 B2
(45) Date of Patent: Feb. 25, 2014

(54) APPARATUS AND METHOD FOR MONITORING HEATED LIQUID BATHS

(75) Inventors: Dieter Pforte, Ohlsbach (DE); Frank Rieger, Durbach (DE)

(73) Assignee: Peter Huber Kaeltemaschinenbau GmbH, Offenburg (DE)

( * ) Notice: Subject to any disclaimer, the term of this patent is extended or adjusted under 35 U.S.C. 154(b) by 309 days.

(21) Appl. No.: 12/935,860

(22) PCT Filed: Mar. 20, 2009

(86) PCT No.: PCT/EP2009/002076
§ 371 (c)(1),
(2), (4) Date: Mar. 15, 2011

(87) PCT Pub. No.: WO2009/121497
PCT Pub. Date: Oct. 8, 2009

(65) Prior Publication Data
US 2011/0175737 A1    Jul. 21, 2011

(30) Foreign Application Priority Data
Mar. 31, 2008 (DE) .................. 10 2008 016 442

(51) Int. Cl.
*G08B 17/00* (2006.01)
(52) U.S. Cl.
USPC ........... 340/584; 392/441; 137/551; 137/558; 700/299
(58) Field of Classification Search
USPC ........... 340/584; 392/494, 441; 137/386, 399, 137/468, 551, 556, 558; 700/299; 219/494; 702/130, 133
See application file for complete search history.

(56) References Cited

U.S. PATENT DOCUMENTS

| 4,564,748 | A  | * | 1/1986 | Gupton ................... | 219/497 |
| 5,808,277 | A  | * | 9/1998 | Dosani et al. ............ | 219/481 |
| 7,027,724 | B2 | * | 4/2006 | Baxter .................... | 392/454 |
| 7,373,080 | B2 | * | 5/2008 | Baxter .................... | 392/454 |

FOREIGN PATENT DOCUMENTS

| EP | 0 380 369 A1 | 8/1990 |
| EP | 1 103 209 A1 | 5/2001 |
| JP | 3-9014 A | 1/1991 |
| JP | 11083009 A | 3/1999 |
| JP | 2002054848 A | 2/2002 |
| JP | 2004340625 A | 12/2004 |
| JP | 2005044740 A | 2/2005 |
| WO | WO 96/25869 A1 | 8/1996 |
| WO | WO 2005/020767 A1 | 3/2005 |

OTHER PUBLICATIONS

Japanese Office Action with English Translation issued in Application No. 2011-502257 on Feb. 8, 2013, 6 pages.

* cited by examiner

*Primary Examiner* — Toan N Pham
(74) *Attorney, Agent, or Firm* — Kilpatrick Townsend & Stockton LLP

(57) ABSTRACT

The invention relates to a method for operating a heated liquid bath heated by a heating device, particularly an electric resistance heater, particularly for monitoring overheating and/or a decrease in the liquid level, wherein by means of a temperature sensor an actual temperature is determined and, as a function of the actual temperature measured with the temperature sensor, an alarm and/or control signal is emitted, wherein by means of the temperature sensor the actual temperature of the heating device or in the region of the heating device is determined. The invention further relates to a device for carrying out said method.

32 Claims, 2 Drawing Sheets

APPARATUS AND METHOD FOR MONITORING HEATED LIQUID BATHS

CROSS-REFERENCES TO RELATED APPLICATIONS

Figure 1:
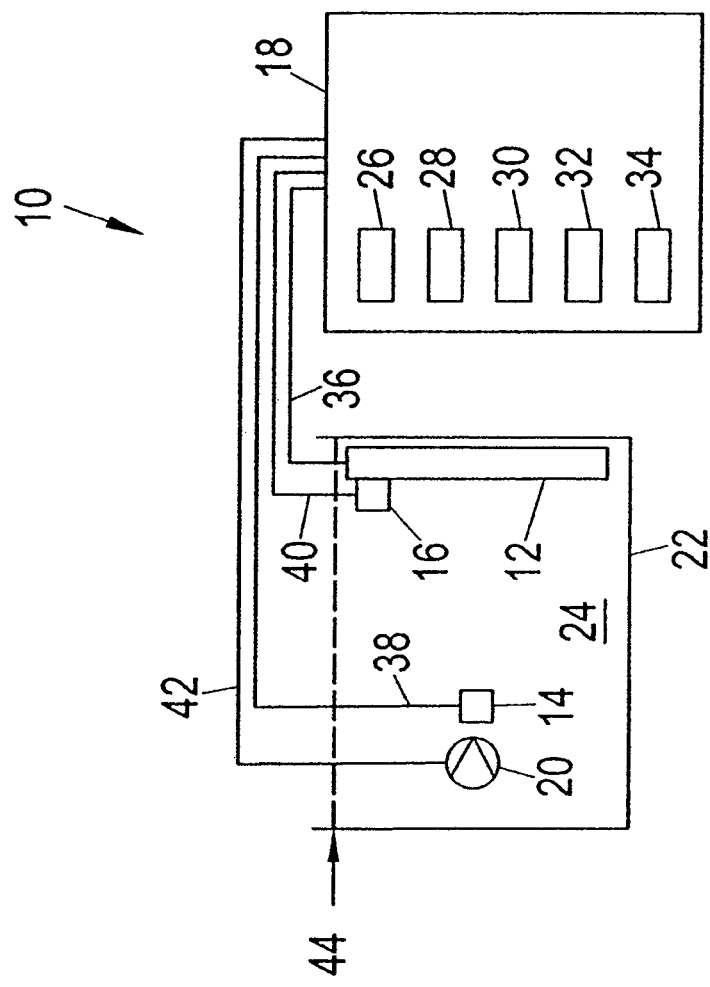

This application is a National Stage of International Application No. PCT/EP2009/002076, filed Mar. 20, 2009, which claims the benefit of German Patent Application No. 10 2008 016 442.9, filed Mar. 31, 2008, the disclosures of which are incorporated herein by reference.

The present invention relates to a method for operating a liquid bath heated by a heating device, in particular by an electric resistance heater, in particular for monitoring for overheating and/or falling of the liquid level, wherein an actual temperature is determined by means of a temperature sensor and an alarm signal and/or a control signal is output in dependence on the actual temperature measured by the temperature sensor. The present invention furthermore relates to an apparatus for operating a liquid bath heated by a heating device, in particular by an electric resistance heater, in particular for monitoring for overheating and/or falling of the liquid level, having a temperature sensor for determining an actual temperature and an alarm signal unit and/or a control signal unit which is made to output an alarm signal and/or a control signal in dependence on the actual temperature measured by the temperature sensor.

Apparatus of the named kind are known and are also called temperature regulators, thermostats or bath thermostats. The liquid in the liquid bath, which is also called a heat carrier, can be combustible. In accordance with the standards DIN EN 61010-2-010 and DIN 12879, such an apparatus must then be equipped with an adjustable over-temperature protection and a low-level protection.

The over-temperature protection is also called an over-temperature limiter. It regulates the heating energy supplied to the heating device such that the actual temperature measured by the temperature sensor does not reach and in particular does not exceed the combustion point of the liquid in the liquid bath. Since the liquid bath is normally circulated, the measured temperature as a rule corresponds to a mean temperature of the liquid bath. It can therefore not be ensured that temperatures occur in specific regions or in the environment of the liquid bath which are higher than the actual temperature measured with the temperature sensor.

In known apparatus, floats are used as low-level protection in the liquid bath with whose aid the position of the liquid level is determined. A fall in the liquid level beneath the designated liquid level can be determined from this. It is, however, problematic, that a float can because caught and so can no longer serve for the determination of the then current liquid level of the liquid bath.

It is the object of the present invention to provide an improved apparatus and an improved method of the initially named kind.

This object is satisfied in a method of the initially named kind in that the actual temperature of the heating device or in the region of the heating device is determined by means of the temperature sensor. In an apparatus of the initially named kind, the object is satisfied in that the temperature sensor is made for determining the actual temperature of the heating device or in the region of the heating device.

The highest temperatures in the liquid bath occur at the heating device or in the environment of the liquid bath. In the method in accordance with the invention, a monitoring of the actual temperature of the heating device takes place by means of the temperature sensor. It can thus be ensured that even the hottest points in the region of the liquid bath do not reach the combustion point of the liquid.

An alarm signal and/or control signal is/are preferably output when the actual temperature of the heating device determined by the temperature sensor reaches a preset maximum temperature. The maximum temperature in this respect can be selected so that, for example, it lies 15 K below the combustion point of the liquid. In particular a reduction in the heating energy which is supplied to the heating device can be triggered by means of the control signal. It can thereby be ensured that the actual temperature of the heating device falls and also that no temperature is reached at the heating device which causes an inflammation of the liquid.

A conventional second temperature sensor for determining the actual temperature of the liquid bath is preferably provided in addition to the temperature sensor at the heating device. The bath temperature can thereby be determined directly and does not have to be derived from the temperature of the heating device.

In accordance with a further preferred embodiment of the invention, an alarm signal and/or a control signal is output when the actual temperature of the heating device measured by the first temperature sensor exceeds the actual temperature of the liquid bath measured by the second temperature sensor by a preset first temperature value, for example 15K, and/or by a second temperature value, for example 30 K. The difference in the actual temperatures between the heating device and the liquid bath can hereby be monitored and, if it exceeds the first temperature value, a response, for example a limiting of the heating energy, can be provided by output of the alarm signal and/or control signal. If the second temperature is exceeded, a fault can be output, for example.

Preferably, furthermore, an alarm signal and/or a control signal, in particular a fault signal, is output when the actual temperature of the liquid bath measured by the second temperature sensor exceeds the actual temperature of the heating device measured by the first temperature sensor by a preset temperature value. If the measured actual temperature of the liquid bath is higher than the measured actual temperature of the heating device, a malfunction of the first temperature sensor and/or of the second temperature sensor is present, which can be indicated via the fault signal.

The first temperature sensor is preferably arranged in an upper region of the heating device and directly at the heating device. There is in particular a good thermal coupling between the first temperature sensor and a critical point of the heating device. This point can, for example, be the upper end of a heating bar of or a heating coil forming the heating device.

Provision can in particular be made that the upper region of the heating device projects above the liquid when the liquid bath is filled up to the designated level. Since the heating device as a rule outputs heat less effectively to the environmental air than to the liquid, the upper region will heat up more than the region of the heating device present in the liquid. Consequently, the highest temperatures, which are monitored by means of the first temperature sensor, will occur in the upper region of the heating device.

In another respect, an inflammation of the liquid is in particular only possible when the liquid has contact with oxygen and a liquid/oxygen mixture can form. It is therefore precluded by the method in accordance with the invention by the arrangement of the first temperature sensor in the upper region of the heating device that temperatures are particularly reached there, in particular after the falling of the liquid level, which result in an ignition of the liquid/oxygen mixture.

A third temperature sensor for determining the actual temperature is preferably further preferred which is arranged in a lower region of the heating device and directly at the heating device. An alarm signal and/or control signal is output in dependence on the difference of the actual temperatures measured by the first and third temperature sensors. An alarm signal and/or control signal can thus in particular be output on too high a temperature drop between the upper region and the lower region of the heating device. Provision can in particular be made to output an alarm signal and/or a control signal when the difference of the actual temperatures is 15 K or 30 K.

An alarm signal and/or control signal can furthermore be output in dependence on the difference of the actual temperatures measured by the second and third temperature sensors. A redundancy is hereby achieved by which it is also ensured on a failure of the first temperature sensor that the difference between an actual temperature at the heating and the actual temperature of the liquid bath is determined.

In accordance with a further embodiment of the invention, a fall in the liquid level of the liquid bath is assumed when a higher actual temperature is measured by the first temperature sensor than by the third temperature sensor. As already mentioned further above, the upper region is first more highly heated than the lower region of the heating device on the falling of the level so that the falling can be determined particularly advantageously by comparison of the actual temperatures of the heating device measured by the first and third temperature sensors.

Optionally, the heating energy which is supplied to the heating device is preferably lowered or switched off when the difference of the actual temperatures measured by the first and third temperature sensors is greater than or equal to a preset third temperature value, in particular 15 K. Further preferably, an alarm signal is output when the difference is greater than or equal to a preset fourth temperature value, in particular 30 K.

Furthermore, an essentially empty liquid bath can be assumed when the actual temperatures of the heated heating device measured by the first and/or third temperature sensors exceed the actual temperature measured by the second temperature sensor. On an empty liquid bath, the second temperature sensor will measure the temperature of the environmental air which remains essentially constant. In contrast, the first temperature sensor and, optionally, the third temperature sensor measure the actual temperatures of the heated heating device. In this respect, a fallen or empty liquid bath can be detected by means of the method in accordance with the invention by comparison of the actual temperatures measured by the first, second and/or third temperature sensors. A float in the liquid bath is no longer needed.

Particularly preferably, a check for an empty liquid level, as described above, is carried out on every switching on of the heating device. A putting into operation with a still empty bath can thereby be prevented.

Further preferably, on the switching on of the heating device, a check is made whether the heating device is working properly in that a brief current pulse is applied to the heating device. If the first and third temperature sensors report a temperature increase, but not the second temperature sensor, it can be assumed that the heating device is working properly.

In accordance with a further preferred embodiment of the invention, a circulation pump is provided for the circulation of the liquid in the liquid bath. A function test of the heating device is preferably carried out with this in that the circulation pump is switched on with a switched off heating device and a determination is made whether the actual temperatures measured by the first temperature sensor and/or the second temperature sensor and/or the third temperature sensor over a preset time period indicate a ramp-like increase after the switching on of the circulation pump which is caused by the heat development of the circulation pump.

The operability of the first temperature sensor and of the second temperature sensor and, optionally, of the third temperature sensor is in particular assumed if the measured actual temperature ramps with a still unheated heating device substantially correspond and/or if, after a preset time, there is no difference between the measured actual temperatures.

If a discrepancy is detected between the measured ramps or actual temperatures, the operational check of the first temperature sensor and of the second temperature sensor and/or of the third temperature sensor can again be carried out after a preset time period. If then a discrepancy is again detected between the ramps or actual temperatures, an alarm signal is preferably output, in particular to inform the user of a possible inoperability of the temperature sensors.

In accordance with a further preferred embodiment of the invention, the combustion point of the liquid is interrogated from a user in that the user is prompted to input the combustion point of the liquid into a control device. Alternatively or additionally, the user can be prompted to input the exact designation of the liquid into the control device. The combustion points for a plurality of liquids are preferably stored in the control device so that the control device can determine the combustion point for the designation input by the user. Further preferably, a plausibility check is made whether the input combustion point corresponds to the combustion point stored for the liquid in the control device in that the combustion points are compared with one another. Optionally, an alarm signal is output if a deviation is detected between the input combustion point and the stored combustion point.

The basic idea of the invention therefore comprises attaching a temperature sensor in the direct proximity of the heating device. Particularly preferably, two sensors are provided, and indeed one in the upper region of the heating device and one in the region of the lower end of the heating device. The bath sensor for maintaining the bath temperature is preferably attaché as usual in the proximity of the circulation pump. The temperature sensors attached to the heating body are preferably attached so close to the heating body that the film temperature of the liquid film formed at the heating body can be measured. The temperature sensors can in particular also be in direct contact with the heating body.

It cannot only be determined with reference to the two or three measured values of the temperature sensors whether an overheating of the heating bath occurs, but a level fall of the bath can also be determined. If, for example, the determined temperature at the upper sensor and at the lower sensor at the heating device increases pronouncedly, while the bath sensor does not detect any temperature increase, then the bath is empty since the bath sensor is measuring the environmental temperature. If only the temperature at the upper heating sensor increases, but not at the lower heating sensor, an overheating is present which is due to a fall in the level of the liquid.

An alarm is output on detecting a fault, in particular an overheating or a level drop of the bath. Provision can also be made to switch off the heating device, with this preferably taking place after a settable time so that an operator can optionally top up liquid in good time and an interruption of the process is not necessary. It is also possible to lower the heating energy on detecting an impending overheating. An interruption of the process can also thereby be avoided. In another respect, the heating coil is conducted upwardly beyond the designated liquid level in a special embodiment and is heated, with the measurement taking place at the upper end in this region. An overheating can thereby be detected at an early time.

In accordance with a further idea, a safety check can be carried out on the switching on of the bath whether the heating is working properly without the temperature adjustment having to be started. A brief current pulse is applied to the heater for this purpose. If the upper temperature sensor and the lower temperature sensor at the heating device report a temperature increase, but not the bath sensor, then the heater is in order. A signal is then output that the bath is empty.

All the described measures can be integral to the invention both individually and in any desired combination with one another.

Figure 2:
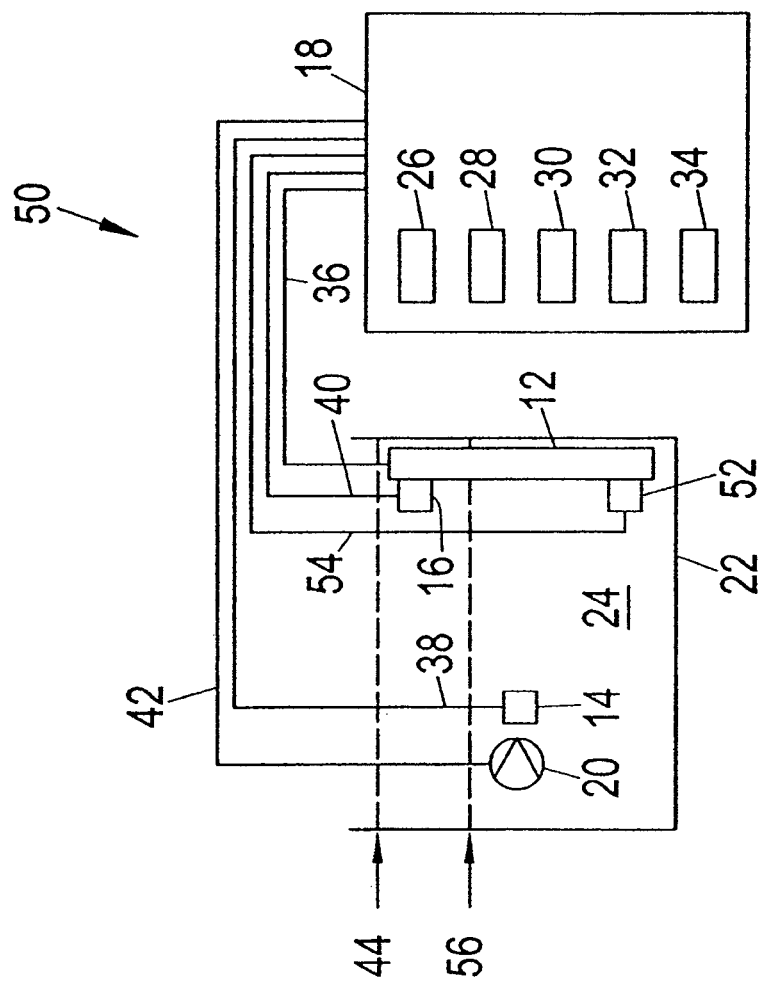

The invention will be described in the following by way of example with reference to advantageous embodiments and to the enclosed drawings. There are shown:

FIG. 1 schematically, a first variant of an apparatus in accordance with the invention;

FIG. 2 schematically, a second variant of an apparatus in accordance with the invention.

The apparatus 10 shown in FIG. 1 has a heating device 12, a first temperature sensor 16, a second temperature sensor 14, a control device 18 and a circulation pump 20. The heating device 12 and the circulation pump 20 are arranged in a container 22 for a liquid bath 24. Furthermore, the second temperature sensor 14 is arranged at the circulation pump 20 and the first temperature sensor 16 is arranged in an upper region directly at the heating device 12.

The control device 18 includes a regulation device 26, a microprocessor 28, a memory 30, an input device 32 which is a keypad, for example, and an output device 34 which is a screen, for example.

The heating device 12, the first temperature sensor 16, the second temperature sensor 14 and the circulation pump 20 are connected to the control device 18 in each case by means of electric leads 36, 38, 40, 42 so that they can be controlled and/or supplied with current by the control device 18.

Provision is in particular made to fill the liquid bath 24 with liquid up to a designated liquid level 44. The heating device 12 and the circulation pump 20 are then completely immersed in the liquid bath 24. The upper end of the heating device 12 can, however, also project somewhat above the designated liquid level and the first temperature sensor can be arranged in this region of the heating device 12 disposed outside the liquid bath.

A user of the apparatus 10 in accordance with the invention can input the temperature to which the liquid should be heated in the liquid bath 20 into the control device 18 via the input device 32. Furthermore, the user can input the combustion point of the liquid in the liquid bath 24 via the input device 32.

Subsequently, the circulation pump 20 is first switched on by the control unit 18 so that the liquid bath 24 is circulated. Then the regulation device 26 regulates the heating device 12 by supplying electrical heat energy and using the actual temperature of the liquid bath 24 measured by means of the second temperature sensor 14 so that said liquid bath is heated to the desired temperature set by the user. In this process, the regulation device 26 monitors the actual temperature of the heating device 12 by means of the first temperature sensor 16.

The actual temperature measured at the heating device 12 by means of the first temperature sensor 16 can be higher than the actual temperature which is measured by the second temperature sensor 14 and which substantially corresponds to a mean temperature of the liquid bath 24 due to the circulation of the liquid bath 24. In this respect, it can be possible that the actual temperature of the heating device 12 increases for heating the liquid bath 24 so that said actual temperature comes into the proximity of the combustion point of the liquid bath 24. This can in particular be the case if the desired temperature lies in the proximity of the combustion point.

The regulation device 26 is made so that it outputs a control signal which triggers a reduction or, optionally, also a switching off, of the supply of the heat energy to the heating device 12 when the actual temperature of the heating device 12 measured by means of the first temperature sensor 16 exceeds a preset maximum temperature.

The maximum temperature is in this respect fixed by the processor 28 with reference to the combustion point of the liquid bath 24 specified by the user, for example so that it is 15 K below the combustion point. It is thus ensured by the control signal that the actual temperature of the heating device 12 is lowered on reaching the maximum temperature and the combustion point of the liquid bath 24 is not reached. An inflammation of the liquid bath 24 is thus avoided.

The regulation device 26 is furthermore made so that it triggers a lowering or switching off of the heating energy which is supplied to the heating device 12 when the difference between the actual temperature measured by the first temperature sensor 16 and the actual temperature measured by the second temperature sensor 14 exceeds a specific value, for example 15 K or 30 K. It is thus ensured that too high a temperature difference does not occur between the heating device 12 and the liquid bath 24 heated thereby. An overshoot of the actual temperature beyond the desired temperature set by the user is in particular avoided by this measure.

Furthermore, the control device 18 is made to output a fault signal via the output device 34 when the difference between the actual temperature measured by the second temperature sensor 14 and the actual temperature measured by the first temperature sensor 16 exceeds a specific positive value. Basically, with a heated heating device 12, the actual temperature measured by the first temperature sensor 16 should be larger than the actual temperature of the liquid bath 24 which is measured by the second temperature sensor 14. In this respect, a fault or a malfunction of the first and/or second temperature sensors 14, 16 can be assumed when this difference exceeds the specific value, for example 3 k, while taking account of a tolerance range. In this case, the control device 18 can in particular output an alarm signal via the output device 34 to draw the attention of the user to a possible malfunction of the temperature sensors 14, 16.

The apparatus 50 shown in FIG. 2 has the elements known from the apparatus 10 for which the same reference numerals are used in FIG. 2. The apparatus 50 furthermore has a third temperature sensor 52 which is connected to the control device 18 via the electric leads 54 so that said temperature sensor can be controlled and/or have a current supplied by the control device 18. The third temperature sensor 52 is arranged in the lower region directly at the heating device 12.

The apparatus 50 carries out the measured described further above with respect to the apparatus 10 to monitor the liquid bath 24 for overheating by means of the first and second temperature sensors 14, 16. The regulation device 26 in the apparatus 50 furthermore compares the actual temperature of the heating device 12 which is measured by the third temperature sensor 52 with the actual temperature of the liquid bath 24 which is measured by the second temperature sensor 14 and outputs a control signal which triggers a reduction or switching off of the heating energy which is supplied to the heating device 12 when the difference in the measured actual temperatures exceeds a specific value, for example 15 K. A redundancy can thereby be achieved in addition to the monitoring of the heating device by the first temperature sensor 16.

The regulating device 26 can also compare the actual temperatures measured by means of the first temperature sensor 16 and of the third temperature sensor 52 with one another and output a control signal in dependence on the difference of these actual temperatures. In this respect, in particular a reduction in the heating energy supplied to the heating device 12 can be effected if this difference exceeds a specific value, for example 15 K or 30 K to counter the effect of overheating in the upper region of the heating device 12.

The regulation device 26 can in this respect in particular be configured so that it is avoided with the greatest priority that an actual temperature measured at the heating device 12 by means of the first or third temperature sensors 16, 52 reaches the combustion point of the liquid and that in particular an alarm signal and/or a control signal is triggered which triggers a reduction in the heating energy supplied to the heating device 12 when an actual temperature measured at the heating device 12 reaches or exceeds the preset maximum temperature.

The regulation device 26 can trigger an alarm signal or control signal with the second greatest priority which in particular lowers the heating energy supplied to the heating device 12 when the difference between the actual temperature of the heating device 12 which is measured by the first temperature sensor 16 and the actual temperature of the liquid bath 24 which is measured by the second temperature sensor 14 exceeds a preset value, for example 15 K. The second highest priority can in this respect also only be optionally taken into account by the regulation device.

The regulation device in addition regulates the heating device 12 with the third highest priority such that a heating of the liquid bath 24 to the desired temperature set by the user takes place.

The liquid level of the liquid bath 24 can differ from the present liquid level 44. For example, the liquid bath can have a fallen liquid level 56. With the fallen liquid level 56, the upper region of the heating device 12 in which the first temperature sensor 16 is arranged is no longer flowed around by liquid. This region is rather surrounded by the environmental air. The heat generated by the heating device 12 is dissipated less effectively to the environmental air than to the liquid. The upper region of the heating device 12 is thereby heated more than the lower region of the heating device 12 which is flowed around by liquid. With a fallen liquid level 56, the first temperature sensor 16 will therefore display a higher actual temperature than the third temperature sensor 52.

The control device 18 makes use of this in that it assumes a drop in the liquid level when a higher actual temperature is measured by the first temperature sensor 16 than by the third temperature sensor 52. The regulation device 26 in particular triggers a lowering or switching off of the electrical heating energy supplied to the heating device 12 when the difference of the actual temperatures measured by the first temperature sensor and the third temperature sensor is larger than or equal to a preset temperature value which amounts, for example, to 15 K or more. The regulation device 26 can also output an alarm signal via the output device 34 in order thus to indicate to the user that the liquid level has presumably fallen.

It can furthermore occur that the apparatus 50 is operation with an essentially empty liquid bath 24. All three temperature sensors 14, 16, 52 are then flowed around by the environmental air. With a heated heating device 12, the actual temperatures measured by means of the first temperature sensor 16 and of the third temperature sensor 52 will therefore increase, whereas the essentially constant temperature of the environmental air is measured by the second temperature sensor 14. These criteria are used by the regulation device 26 to recognize an empty liquid bath. The regulation device 26 in particular triggers a control signal to switch off the heating device after the end of a preset time after the regulation device assumes a drying out of the liquid bath 24. In addition, the regulation device 26 can be made to output an alarm signal for a user to indicate to him that the liquid bath 24 is empty and optionally to prompt him to top up liquid.

The regulation device 26 is preferably made to carry out the above-described test for drying out or for falling of the liquid level before the start of a temperature control of the heating device 12. The attention of a user can thereby already be drawn to a fallen or empty liquid bath 24 at the start of the temperature control.

The regulation device 26 can furthermore be made so that a test is made before the heating device 12 is put into operation whether the temperature sensors 14, 16, 52 work properly. For this purpose, the circulation pump 20 is switched on and the actual temperatures are determined by means of the three temperature sensors 14, 16, 52 after the end of a preset time after the switching on of the pump 20, for example after 10 seconds. The three temperature sensors 14, 16, 52 should then essentially indicate the same temperature and/or the same temperature ramp over the preset time since the liquid bath 24 is heated by the circulation pump 20. If a deviation of the actual temperatures displayed by the three temperature sensors 14, 16, 532 beyond a fixed confidence interval, for example 3 K, is found, the regulation device 26 can be configured so that it measures the actual temperatures or ramps again using the three temperature sensors after the end of a further time interval. if the three actual temperatures or ramps then still do not coincide, it is assumed that at least one of the temperature sensors 14, 16, 52 is inoperable and the control device 18 outputs a corresponding fault report to the user by means of the output device 34.

As already mentioned, the user can, on the one hand, set the desired temperature to which the liquid bath 24 should be heated. On the other hand, the user is prompted by the control device 18 to input the combustion point for the liquid in the liquid bath 24. The user can further be prompted by the control device 18 to input an exact designation for the liquid which is in the liquid bath 24. An association between exact designations of a plurality of liquids and their combustion points can be stored in the memory 30. The processor 28 can then, on the basis of the designation set by the user, read out the combustion point stored for it in the memory 30 and can compare it with the combustion point input by the user. A plausibility check can hereby take place whether the user has actually input the correct combustion point. The control device 18 can in particular output an alarm signal to the user if a discrepancy is found between the input combustion point and the stored combustion point.

REFERENCE NUMERAL LIST 10 apparatus
12 heating device
14 second temperature sensor
16 first temperature sensor
18 control device
20 circulation pump
22 container
24 liquid bath
26 regulation device
28 microprocessor
30 memory 32 input device
34 output device
36 electrical lead
38 electrical lead
40 electrical lead
42 electrical lead
44 liquid level
50 apparatus
52 third temperature sensor
54 electrical lead
56 fallen liquid level

The invention claimed is:

1. A method for monitoring a liquid bath, heated by a heating device, to monitor overheating and/or falling of a liquid level within the liquid bath, comprising:
measuring a first temperature with a first temperature sensor in an immediate vicinity of the heating device, wherein the first temperature is indicative of a temperature of the heating device; and
outputting a signal, comprising at least one of an alarm signal and a control signal, when the first temperature meets one of the following conditions:
the first temperature exceeds a first threshold temperature; or
the first temperature is below a second threshold temperature.

2. The method in accordance with claim 1, comprising outputting the signal when the first temperature exceeds the first threshold temperature, wherein the first threshold temperature is a preset maximum temperature.

3. The method in accordance with claim 2, wherein the preset maximum temperature is a temperature lying below a combustion point of the liquid bath by a specific amount.

4. The method in accordance with claim 1, further comprising measuring a second temperature of the liquid bath with a second temperature sensor.

5. The method in accordance with claim 4, comprising outputting the signal when the first temperature exceeds the first threshold temperature, wherein the first threshold temperature is a temperature that exceeds the second temperature by a certain value.

6. The method in accordance with claim 5, wherein the signal is indicative of an empty liquid bath.

7. The method in accordance with claim 4, comprising outputting the signal when the first temperature is below the second threshold temperature, wherein the second threshold temperature is a temperature that is below the second temperature by a certain value.

8. The method in accordance with claim 4, further comprising performing a function test of the heating device, wherein the function test comprises:
applying a brief current pulse to the heating device before the main switching on of the heating device; and
assuming that the heating device is operating properly when the first temperature increases and the second temperature sensor does not increase.

9. The method in accordance with claim 4, further comprising performing a function test wherein the function test comprises:
with the heating device switched off, switching on a circulation pump and measuring at least one of the first temperature and the second temperature; and
outputting an additional signal, comprising at least one of an additional alarm signal and an additional control signal, when at least one of the following conditions is met:
the first and second temperatures do not display any essentially coinciding increase; and
a difference between the first and second temperatures exceeds a preset value after a preset time.

10. The method in accordance with claim 9, wherein the function test further comprises switching on the heating device after an additional preset time; subsequently checking whether the temperatures have changed; and outputting a further signal comprising at least one of a further alarm signal and a further control signal when the temperatures have not changed.

11. The method in accordance with claim 1, wherein the first temperature sensor is disposed at an upper region of the heating device, the method further comprising:
measuring a third temperature in an additional immediate vicinity of the heating device with a third temperature sensor disposed at a lower region of the heating device; and
outputting an additional signal, comprising at least one of an additional alarm signal and an additional control signal, when the third temperature meets certain additional conditions.

12. The method in accordance with claim 11, wherein the additional signal is indicative of a falling of the liquid level of the liquid bath, and wherein the certain additional conditions comprise the first temperature being higher than the third temperature.

13. The method in accordance with claim 1, further comprising making a plausibility check, wherein making the plausibility check comprises:
prompting a user to input a combustion point of a liquid within the liquid bath, and a designation of the liquid, into a control device;
comparing the combustion point that the user has input with a combustion point stored in the control device for the liquid; and
outputting an additional alarm signal when a deviation is found between the input combustion point and the stored combustion point.

14. The method in accordance with claim 1, wherein the signal that is output comprises the control signal, wherein the control signal triggers a lowering or switching off of heating energy for the heating device after the end of a preset time interval.

15. The method in accordance with claim 1, wherein the first temperature sensor is disposed in direct physical and thermal contact with the heating device, such that the first temperature is the temperature of the heating device.

16. The method in accordance with claim 1, wherein the first temperature sensor is disposed immediately adjacent the heating device, and is located and configured such that the first temperature is a boundary condition temperature of a portion of a liquid within the liquid bath at the surface of the heating device, wherein, during operation, the boundary condition temperature is higher than a bulk temperature of the liquid within the liquid bath.

17. An apparatus for monitoring a liquid bath, heated by a heating device, to monitor overheating and/or falling of a liquid level within the liquid bath, comprising:
a first temperature sensor disposed in an immediate vicinity of the heating device, and configured to measure a first temperature, wherein the first temperature is indicative of a temperature of the heating device; and
a signal unit comprising at least one of an alarm signal unit, configured to output an alarm signal, and a control signal unit, configured to output a control signal, when the first temperature meets one of the following conditions:
the first temperature exceeds a first threshold temperature; or the first temperature is below a second threshold temperature.

18. The apparatus in accordance with claim 17, further comprising a second temperature sensor configured to measure a second temperature of the liquid bath.

19. The apparatus in accordance with claim 18, wherein the first temperature sensor is disposed at an upper region of the heating device, the apparatus further comprising:
a third temperature sensor disposed at a lower region of the heating device and configured to measure a third temperature in an additional immediate vicinity of the heating device.

20. The apparatus in accordance with claim 19, wherein the first and the third temperature sensors are disposed at hottest points of the heating device.

21. The apparatus in accordance with claim 18, wherein the first temperature sensor is disposed above a designated liquid level.

22. The apparatus in accordance with claim 18, wherein the second temperature sensor is disposed spatially remote from the heating device.

23. The apparatus in accordance with claim 22, wherein the second temperature sensor is disposed in a lower region of the liquid bath.

24. The apparatus in accordance with claim 22, further comprising a circulation pump disposed within the liquid bath, wherein the second temperature sensor is disposed near the circulation pump.

25. The apparatus in accordance with claim 18, wherein the first temperature sensor is disposed in direct physical and thermal contact with the heating device, such that the first temperature is the temperature of the heating device.

26. The apparatus in accordance with claim 18, wherein the first temperature sensor is disposed immediately adjacent the heating device, and is located and configured such that the first temperature is a boundary condition temperature of a portion of a liquid within the liquid bath at the surface of the heating device, wherein, during operation, the boundary condition temperature is higher than a bulk temperature of the liquid within the liquid bath.

27. The apparatus in accordance with claim 17, wherein the first temperature sensor is disposed at an upper region of the heating device, the apparatus further comprising:
a third temperature sensor disposed at a lower region of the heating device and configured to measure a third temperature in an additional immediate vicinity of the heating device.

28. The apparatus in accordance with claim 27, wherein the first and the third temperature sensors are disposed at hottest points of the heating device.

29. The apparatus in accordance with claim 27, wherein the signal unit is further configured to output an additional signal, comprising at least one of an additional alarm signal and an additional control signal, when the third temperature meets certain additional conditions.

30. The apparatus in accordance with claim 17, wherein the first temperature sensor is disposed above a designated liquid level.

31. The apparatus in accordance with claim 17, wherein the first temperature sensor is disposed in direct physical and thermal contact with the heating device, such that the first temperature is the temperature of the heating device.

32. The apparatus in accordance with claim 17, wherein the first temperature sensor is disposed immediately adjacent the heating device, and is located and configured such that the first temperature is a boundary condition temperature of a portion of a liquid within the liquid bath at the surface of the heating device, wherein, during operation, the boundary condition temperature is higher than a bulk temperature of the liquid within the liquid bath.

* * * * *